Oct. 9, 1934.     W. W. TRICKEY     1,976,589
PIPE JOINT
Filed April 20, 1933
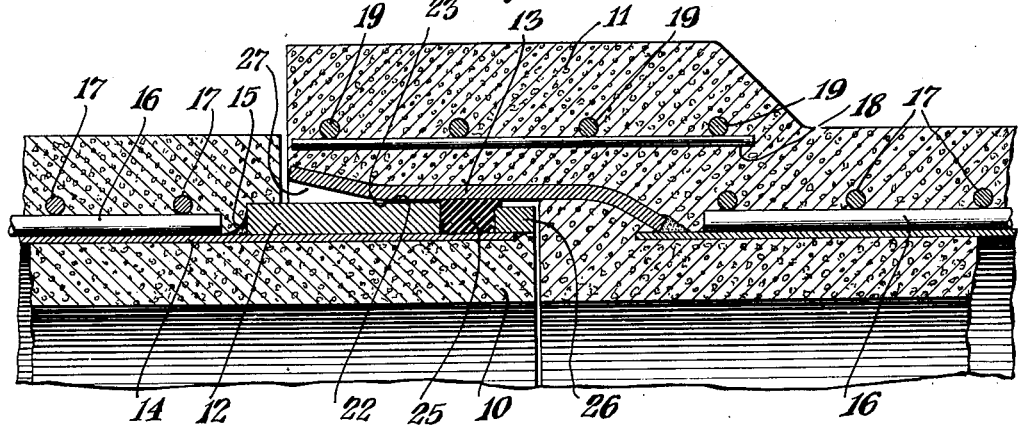
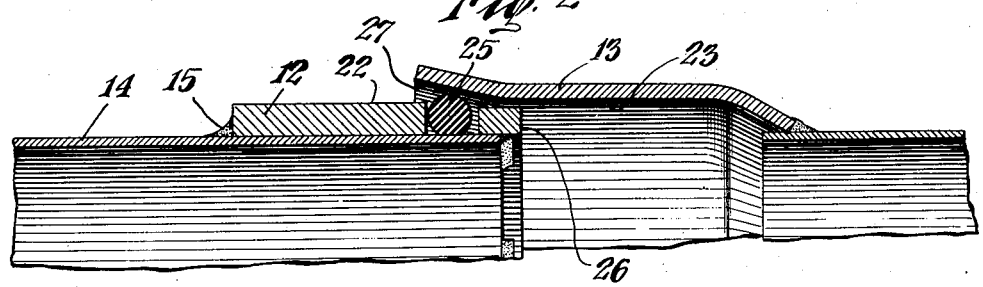
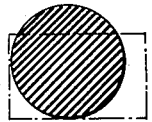 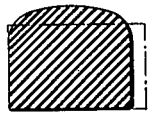 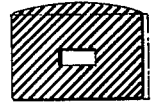 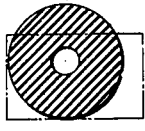
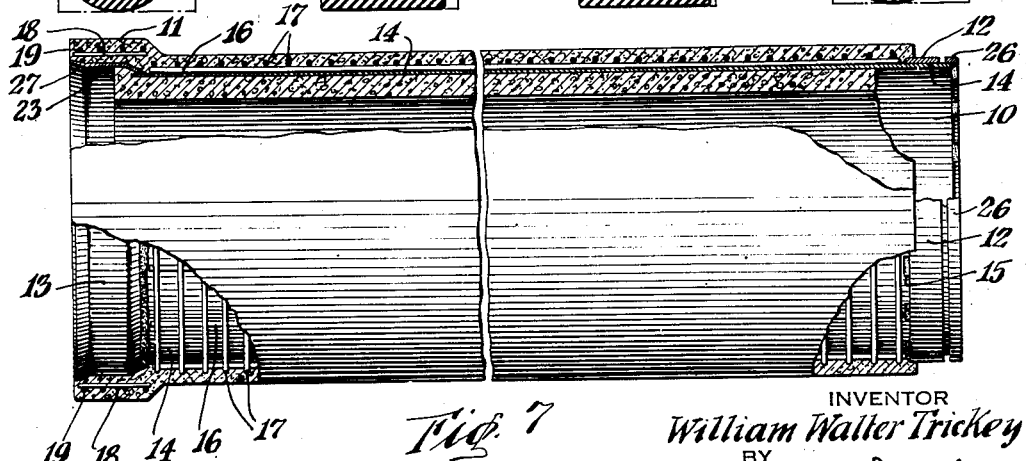
INVENTOR
William Walter Trickey
BY
Cooper, Kerr & Dunham
ATTORNEYS Patented Oct. 9, 1934

1,976,589

UNITED STATES PATENT OFFICE 1,976,589

PIPE JOINT

William Walter Trickey, East Orange, N. J., assignor to Lock Joint Pipe Company, East Orange, N. J., a corporation of New Jersey Application April 20, 1933, Serial No. 666,941

2 Claims. (Cl. 285—161)

This invention relates to pipe joints. The principal object of the invention is to provide a pipe joint of a simple and economical construction and which may be completely assembled and closed with minimum manipulation.

Other objects of the invention are to enable the use of rubber as a permanent seal or gasket and to provide a joint which dispenses with the necessity of using any other sealing medium.

Other objects and advantages will appear in the appended claims and accompanying description in which I have disclosed, by way of example, preferred embodiments of the invention, and what I now consider to be the best modes in which I contemplate applying the principle of the invention.

In the drawing, Fig. 1 is a longitudinal section of a pipe joint employing the principle of the invention.

Fig. 2 is a longitudinal section showing the relation of the engaging members of a joint before the members are brought together.

Figs. 3, 4, 5 and 6 illustrate different cross-sectional shapes for gaskets.

Fig. 7 is a longitudinal view, partly in section, of a pipe having bell and spigot ends as illustrated in Fig. 1.

In the continuing effort which is being exerted towards reducing costs of construction of pipe joints and of installation of pipe lines, it has long been an objective to obtain a pipe joint which may be completed in the bringing together of the joining elements of two connecting pipes. Few of the products employing the principles of such designs, if any, have attained success, and it was frequently the case that, in order to make the joints secure, work or finishing in addition to that which had been anticipated was found necessary. In general, prior efforts have not come into common use because of reasons which gave rise to expense which had not been calculated for or because of limited usefulness.

The joint of my invention utilizes but one sealing gasket and except for the proper forming of the joining members, the preliminary mounting of the sealing gasket, and the bringing together of the joining members, there remains nothing more to do for completing the joint. The spigot and bell members are provided with means for compressing the sealing gasket as the two members are brought together and joined and the same members entirely encase the sealing gasket so far as it is possible to do under practical conditions. When maintained in a compressed state, rubber serves as an excellent gasket for sealing against the passage of fluids and the spigot and bell of my invention make it possible to use rubber as a permanent seal by so completely encasing the rubber within the joint as to materially reduce the factors which are considered to stand in the way of utilizing rubber in such capacity. Additional sealing mediums are not required and there is considerable saving on account of this fact alone. Also, without sacrifice of strength, the joint of my invention enables an appreciable saving in labor costs incident to the manufacture of concrete pipe particularly.

In Fig. 1 I have shown a longitudinal section of a joint embodying the principle of my invention. In general, the joint includes a spigot 10 and bell 11 provided with a spigot member 12 and a bell member 13, respectively. As shown in Fig. 7, each pipe section is provided with metallic spigot and bell ends. The spigot member 12 and the bell member 13 are mounted upon opposite ends of a metallic tube or sleeve 14. The metallic tube 14 is attached to the metallic spigot and bell members to form a metallic tube for the full length of the pipe section. Whereas the invention is applicable to metallic pipes, it is nevertheless peculiarly adapted to the reduction of costs in the manufacture of pipes made of concrete or of other originally plastic but subsequently hardened material. In Figs. 1 and 7 I have shown the application of the invention to concrete pipe having metallic reinforcing. For reasons which will appear more fully hereinafter, it is necessary only that the spigot member 12 be attached to the tube securely enough to maintain the spigot member in its position upon the tube. To accomplish this it is not necessary to weld the spigot member to the tube about its entire circumference, and the less costly method of spacing the welds may be employed. A series of tack-welds as at 15 will suffice to hold the spigot member in place upon the tube and the ring 26 upon the outer end of the tube may be secured in place in the same manner. The space between the spigot member 12 and ring 26 is for receiving an elastic gasket and, inasmuch as the elastic gasket bears directly against the tube, it is not necessary to make water-tight joints between the tube and the two rings 12 and 26.

For the larger sizes of concrete pipes, it is preferable to provide additional metallic reinforcing to supplement the strength afforded by the tube and associated rings, and for this purpose reinforcing rods or bands may be employed. Such additional metallic reinforcing is illustrated, by way of example, as longitudinal reinforcing rods 16 and circumferential reinforcing rods 17 for the main body of the pipe, and longitudinal reinforcing rods 18 and circumferential reinforcing rods 19 for the bell.

When the joint is closed no part of the tube is exposed to conditions outside of the pipe because the side of the spigot member 12 furthest away from the end of the pipe is embedded in concrete and the bearing surface 22 comes into contacting relation with the bearing surface 23 of the bell member. Also, the thickness of the spigot member assures protection to the tube as well as contributes desired rigidity and strength to the spigot.

The diameter of the outer surface 22 of the spigot member 12 and the diameter of the inner surface 23 of the bell member 13 are of such dimensions as to permit the two members to engage snugly so as to provide as close a fit as possible under practical conditions. The fit should not be so tight as to involve unnecessary difficulty in uniting the bell and spigot, but it should be such as to protect the gasket from the outside and also to center the bell over the spigot to thereby keep uniform throughout the space occupied by the gasket 25. The gasket is of elastic material and by maintaining a uniform space for its confinement, it is caused to exert a uniform sealing pressure throughout the entire circumference of the joint.

The spigot end of the cylindrical sleeve 14 has secured thereto a ring 26 spaced from the spigot member 12 a distance sufficient to accommodate the gasket 25. As in the case of spigot member 12, ring 26 need only be welded to the tube at intervals about its circumference. This is because the sealing of the joint by the elastic gasket 25 is all that is necessary. The sealing is completely effected at the gasket between tube 14, gasket 25 and bell member 13.

The free end of the bell member 13 is provided with a flaring surface 27 which tapers outwardly from the cylindrical surface 23. This flare serves to compress the gasket 25 into the circumferential groove between the spigot member 12 and ring 26 when the spigot and bell are joined.

In Fig. 2 I have illustrated the relation of the bell and spigot members before the joint is closed. The spigot and bell members are shown joined to their respective cylindrical sleeves or tubes. The concrete and reinforcing rods shown in Fig. 1 are omitted in Fig. 2 and it is obvious that the invention may be employed with other kinds of pipes such as those made wholly from steel or cast iron, for example.

The joint is automatically self-sealing as the bell is shoved home over the spigot or as the spigot is shoved home into the bell, and any material may be used for the gasket which has elastic and sealing characteristics of rubber. However, the use of rubber is preferred, and an attribute of the joint is that it affords protection to the gasket from the atmosphere and thereby enables the use of rubber as a permanent gasket. It will be appreciated that this aspect of the invention, whereby the use of rubber as a permanent gasket is made possible, may be made use of with cast concrete pipe not having the steel tube and steel rings in the spigot and bell.

The gasket may be made upon the job by cutting a rubber strip to such length that when the ends are joined together, the ring formed will be stretched when being applied to the spigot. The ends of the rubber strip may be cemented or joined together by some mechanical means, such as a wire lacing, and the ring thus formed then slipped over the end spigot member or ring 26 and into its circumferential groove. A closed rubber ring moulded to the size desired would also serve the purpose. The ring 26 will maintain the rubber ring within its groove while the pipes are being placed into position just before joining.

In order to obtain an effective seal, it is necessary that the shape and cross-sectional area of the elastic ring be such as to cause expansive force to be exerted upon the opposing surfaces of the bell and spigot when the joint is closed. Sufficient expansive force may be obtained either by providing material for the ring having a larger cross-sectional area than the annular recess formed by the circumferential groove and encasing surface 23 of the bell member, or by giving the material a cross-sectional shape that will require distortion before it can be confined within the annular recess. I have obtained satisfactory results by utilizing rubber having a rectangular cross-section similar to the rectangular cross-section of the annular recess, except for the provision of slightly more rubber than the amount that would be necessary to fill the annular recess without compression. The slight excess of rubber is squeezed out of the annular recess and along the face 23 of the bell member. So proportioned in relation to the annular recess, the gasket fills the recess and effectively seals against leakage as the result of the expansive force exerted upon the confining walls.

When such a joint is assembled, the rubber gasket will resist the bringing together of the bell and spigot members. The flaring surface 27 at the open end of the bell member serves to compress the gasket within its annular recess as the bell and spigot are brought together. The slope of the flaring surface is such that the resistance created by the gasket is gradually overcome as the two pipe sections are joined, and there is no tendency to dislodge or damage the gasket.

I have also obtained satisfactory results by using a gasket having a circular cross-section as illustrated in Fig. 3. The area of the cross-section of this gasket may be approximately equal to or less than the cross-sectional area of the annular recess. The relative proportion of the circular cross-section of the gasket to the rectangular cross-section of the annular recess may be appreciated from a study of Fig. 2. The smallest area of a circular area for a gasket is limited by the sealing effect that may be obtained. The distortion of the circular shape when the bell and spigot members are joined, in itself will cause such expansive force upon the retaining walls of the recess as will produce the desired sealing effect.

To demonstrate the effect of amount of cross-sectional area and shape, other forms of cross-sections are shown in Figs. 4, 5 and 6. In Fig. 4, the gasket has a rectangular bottom portion and a convex upper surface. The width of the cross-section would, in this case, be less than the width of the annular recess to provide for the accommodation of the material in the convex upper portion when the upper portion is flattened by the cylindrical surface of the bell member.

In Fig. 5 I have shown another cross-sectional shape for the gasket in which the outside perimeter surrounds an area greater than that of the cross-sectional shape shown in Fig. 4. The volume of material contained in gaskets having the cross-sectional shapes shown in Figs. 4 and 5 may, however, be substantially the same because of the presence of an empty bore in the gasket whose cross-section has the longest perimeter. The same manner of compensating for different areas and for differently shaped gaskets may be availed of in gaskets having other forms. For example, in Fig. 6, I have shown a circular cross-sectional shape for the gasket which is larger than the circular cross-sectional shape shown in Fig. 3, but the solid areas in the two shapes are substantially the same because of the empty bore within the area having the longest perimeter.

As may be seen in Fig. 1, the joint affords complete protection for the gasket from outside of the joint, and provides conditions making suitable the use of rubber for the gasket. The fit between the outer surface of the spigot member and the inner surface of the bell member is such as to close off from the outside the annular recess which confines the rubber. The gasket is protected from the outside elements and its opportunity for deterioration is substantially eliminated. Since rubber may be thus entirely encased and protected from deterioration and since it is itself an effective seal, no other sealing gasket is required.

The making of the joint is completed when the two pipe sections are brought together with the gasket in place.

From Fig. 7 it will be observed that the one-piece character of the tube 14 and attached bell member 13 makes it possible to provide, in a concrete pipe, a steel conduit which is continuous from one end of a pipe section to its other end. The steel conduits of connecting pipe sections overlap at their joining ends in the manner illustrated in Fig. 1 and this results in a pipe line which is secure against leakage independent of the bodies of concrete forming the interior and exterior of each pipe section. Accordingly, while coverings of concrete upon the interior and exterior are substantially coextensive with a pipe line there can be no leakage because of defects in the concrete or failure thereof.

What is claimed is:

1. In a pipe joint the combination with pipe sections, of a spigot for one of said pipe sections, said spigot having a bearing surface and a circumferential groove between the ends of the spigot, an elastic gasket in the form of a band of rubber mounted within said circumferential groove, said gasket normally having such a cross-sectional area in respect to the cross-sectional area of the groove as to require deformation of the rubber for its encasement within the confines of the groove, a bell for the other of said pipe sections, a cylindrical surface on the inside of said bell having an inner diameter small enough to close off said circumferential groove substantially completely from the outside of the pipe sections so as to protect the gasket from outside air when the spigot and bell are joined, and means for reducing the outer diameter of the gasket to the inner diameter of the bell to encase the gasket within the circumferential groove as the bell and spigot are brought together.

2. In a pipe joint the combination with pipe sections, of a spigot on the end of one of said pipe sections, said spigot having a circumferential groove between the ends of the spigot for locating a gasket, an elastic gasket consisting of a band of rubber mounted in said circumferential groove, said gasket having a cross-sectional area which, in respect to the cross-sectional area of the groove below the outer surface of the spigot, is such as to enable the gasket to be substantially all contained within the groove when it is deformed by the closing of the open side of the groove, and a bell at the end of another of said pipe sections for engaging said spigot and having an inner surface provided with a bearing portion and a portion adapted to contact with and compress said gasket, the diameter of the bearing portion of the inner surface of the bell being but slightly greater than the diameter of the outer bearing surface of the spigot so as to cause uniform compression of the gasket throughout its circumference while confining the gasket within the groove and between the opposing surfaces of said spigot and bell.

WILLIAM WALTER TRICKEY.